| (12) United States Patent<br>Muehl et al. | (10) Patent No.: US 7,341,197 B2<br>(45) Date of Patent: Mar. 11, 2008 |

(54) COMPONENT TAGGING WITH MAINTENANCE RELATED INFORMATION IN OPEN AND CLOSED FORMATS

(75) Inventors: Gordon Muehl, Oestringen (DE); Klaus Irle, Walldorf (DE); Walter G. Kienle, St. Leon-Rot (DE); Knut Heusermann, Rauenberg (DE)

(73) Assignee: SAP Aktiengesellschaft, Walldorf (DE)

( * ) Notice: Subject to any disclaimer, the term of this patent is extended or adjusted under 35 U.S.C. 154(b) by 204 days.

(21) Appl. No.: 10/210,191

(22) Filed: Jul. 31, 2002

(65) Prior Publication Data

US 2004/0020994 A1 Feb. 5, 2004

(51) Int. Cl.
*G06K 19/06* (2006.01)

(52) U.S. Cl. ............... 235/492; 235/380; 235/385; 715/514; 702/184

(58) Field of Classification Search ........... 235/385, 235/484, 492, 380; 715/514; 702/184
See application file for complete search history.

(56) References Cited

U.S. PATENT DOCUMENTS

| 5,058,044 | A | 10/1991 | Stewart et al. |
| 5,250,761 | A | 10/1993 | Koyanagi |
| 5,442,553 | A | 8/1995 | Parrillo |
| 5,459,304 | A * | 10/1995 | Eisenmann ............ 235/380 |
| 5,495,581 | A * | 2/1996 | Tsai ................... 395/154 |
| 5,515,043 | A | 5/1996 | Berard et al. |
| 5,659,470 | A | 8/1997 | Goska et al. |
| 5,758,300 | A | 5/1998 | Abe |
| 5,793,027 | A * | 8/1998 | Baik ................... 235/380 |
| 5,864,784 | A | 1/1999 | Brayton et al. |
| 5,910,776 | A | 6/1999 | Black |
| 5,922,037 | A | 7/1999 | Potts |
| 5,963,134 | A | 10/1999 | Bowers et al. |
| 6,006,171 | A | 12/1999 | Vines et al. |
| 6,061,614 | A | 5/2000 | Carrender et al. |
| 6,069,570 | A | 5/2000 | Herring |
| 6,073,062 | A * | 6/2000 | Hoshino et al. ............ 701/3 |
| 6,094,657 | A | 7/2000 | Hailpern et al. |
| 6,101,433 | A | 8/2000 | Flicker, Jr. |
| 6,107,917 | A | 8/2000 | Carrender et al. |
| 6,112,152 | A | 8/2000 | Tuttle |
| 6,170,742 | B1 | 1/2001 | Yacoob |
| 6,181,994 | B1 | 1/2001 | Colson et al. |

(Continued)

FOREIGN PATENT DOCUMENTS

EP 0 553 905 A1 8/1993

(Continued)

*Primary Examiner*—Seung Ho Lee
(74) *Attorney, Agent, or Firm*—Fish & Richardson P.C.

(57) ABSTRACT

A method for maintaining a complex article, including retrieving maintenance information relating to maintenance of a component of a complex article from an electronically-accessible tag coupled to the component and applying the retrieved maintenance information to a determination regarding maintenance of the complex article. A device including a complex article including a first component and a second component, the first and second components being one of individually replaceable and maintainable. The first component is tagged with a first tag that stores first computer accessible information including a first identifier identifying the first component and first maintenance information describing maintenance of the first component. The second component is tagged with a second tag that stores second computer accessible information including a second identifier identifying the second component and second maintenance information describing maintenance of the second component.

25 Claims, 7 Drawing Sheets

U.S. PATENT DOCUMENTS

| | | |
|---|---|---|
| 6,222,463 B1 | 4/2001 | Rai |
| 6,223,137 B1 | 4/2001 | McCay et al. |
| 6,292,806 B1 | 9/2001 | Sandifer |
| 6,321,178 B1 | 11/2001 | Sugano et al. |
| 6,321,983 B1 | 11/2001 | Katayanagi et al. |
| 6,389,337 B1 | 5/2002 | Kolls |
| 6,417,760 B1 | 7/2002 | Mabuchi et al. |
| 6,557,752 B1 | 5/2003 | Yacoob |
| 6,568,436 B1 | 5/2003 | Matthews et al. |
| 6,574,518 B1 | 6/2003 | Lounsberry et al. .......... 700/90 |
| 6,585,009 B2 | 7/2003 | Matthews et al. |
| 6,616,034 B2 | 9/2003 | Wu et al. ................... 235/375 |
| 6,671,646 B2 | 12/2003 | Manegold et al. |
| 6,819,986 B2 | 11/2004 | Hong et al. |
| 6,859,757 B2 | 2/2005 | Muehl et al. |
| 2001/0002451 A1 | 5/2001 | Breed |
| 2001/0047283 A1 | 11/2001 | Melick et al. |
| 2002/0059075 A1 | 5/2002 | Schick et al. |
| 2002/0123933 A1 | 9/2002 | Himes |
| 2002/0167393 A1 | 11/2002 | Mabuchi et al. |
| 2002/0195503 A1 | 12/2002 | Allen et al. |
| 2003/0061005 A1 | 3/2003 | Manegold et al. |
| 2003/0069648 A1 | 4/2003 | Douglas et al. |
| 2003/0069673 A1 | 4/2003 | Hong et al. |
| 2003/0095038 A1 | 5/2003 | Dix |
| 2003/0102970 A1 | 6/2003 | Creel et al. |
| 2003/0120501 A1 | 6/2003 | Peters et al. |
| 2004/0024501 A1 | 2/2004 | Muehl et al. |
| 2004/0024570 A1 | 2/2004 | Muehl et al. |

FOREIGN PATENT DOCUMENTS

| | | |
|---|---|---|
| GB | 2 366 430 A | 3/2002 |
| WO | WO 00/48139 | 8/2000 |

* cited by examiner

| Header<br>Bits 0-7 | EPC<br>Manager<br>Bits 8-35 | Object<br>Class<br>Bits 36-59 | Object Serial<br>Number<br>Bits 60-95 |
|---|---|---|---|
| 96-Bit Electronic Product Code. MIT AutoID Center ||||

COMPONENT TAGGING WITH MAINTENANCE RELATED INFORMATION IN OPEN AND CLOSED FORMATS

BACKGROUND

This invention relates to maintenance.

The tagging of articles with computer-readable identifiers and information has provided great improvements in areas such as supply chain management, asset tracking and management, security and access control, transportation, toll collection, baggage handling, inventory control and management, healthcare, and consumer services. For example, bar codes can be used to track the storage and movement of objects ranging from foodstuffs to coupons. Radio frequency identification ("RFID") tags can be used to track individuals as they access restricted locations and services. Smart cards can be used to store insurance information, medical records, and phone accounts. Examples of computer-readable tags include, active and passive RFID tags, integrated circuit ("IC") microprocessor cards and memory cards, optical memory cards, barcodes, tags, and smart cards.

SUMMARY

The present invention provides method and apparatus, including computer-program products, for tagging articles with maintenance related information. Articles that can be tagged include complex articles and components of complex articles. The phrase 'complex article' is used in this specification to refer to tangible objects and devices that are assembled from individually taggable components. The components are individually replaceable or maintainable on the complex article. Examples of complex articles include motor vehicles, trains, aircraft, ships, military hardware and vehicles, buildings, and assembly lines. Examples of components include engines, axels, wheels, arms, and body frames. Complex articles are physical incarnations formed by one or more physical components that are amenable to being separately tagged with a unique, computer-readable identifier.

In general, in one aspect, the invention features systems and methods, and components configured to perform aspects of the methods, for maintaining complex articles. In one aspect the invention provides a method for storing maintenance information on an electronically-accessible tag that is coupled to an article. The method includes storing maintenance information in both a first and second format in the electronically accessible tag where the first format is in accordance with an open standard and the second format is in accordance with a closed standard.

Aspects of the invention can include one or more of the following features. The method can include storing maintenance information in a format that is device independent. Storing maintenance information in the first format can include storing the maintenance information in a format that is in accordance with one of RTF, ASCII, and PDF. Storing maintenance information in the second format includes storing the maintenance information in a format that is proprietary and that can only be accessed by proprietary devices.

The method can include retrieving the maintenance data, updating the format of the maintenance data and storing the maintenance data with the updated format in the electronically accessible tag. Storing maintenance data can include storing maintenance procedures and technical specifications related to the article. Storing maintenance information can include storing a first type of maintenance information in the first format and storing a second type of maintenance information in the second format. Storing a first type of maintenance information in the first format includes storing maintenance logs in the first format and storing maintenance procedures and technical specifications in the second format. Storing maintenance information can include storing maintenance information of a component of one of an aircraft, a sea going vessel, and a vessel that travels on land.

In another aspect, the invention provides an electronically accessible tag that includes a memory that includes maintenance data of a first and a second format where the first format is in accordance with an open standard and the second format is in accordance with a closed standard.

Aspects of the invention can include one or more of the following features. The first format can be device independent. The maintenance data can include maintenance procedures and technical specifications of an article. The electronically accessible tag can include an input and output device for sending maintenance data and receiving updated maintenance data, and a processor and logic for updating the first and second format. Maintenance data of the first format can include maintenance logs and maintenance data of the second format can include maintenance procedures and technical specifications.

The invention can be implemented to realize one or more of the following advantages. By tagging one or more components of a complex article, technical information as well as repair, replacement, and/or maintenance records for the tagged components can be maintained separately from other records and accessed directly on the component itself. Such tagging greatly simplifies the handling of technical information and maintenance, replacement and/or repair records for the complex article, and the tracking of component maintenance as the component moves from location to location. For example, when an aircraft engine component is removed from an airplane and a new engine component is substituted, the maintenance records for both engine components can remain physically joined to the individual or respective components and accessible on the components themselves. Moreover, each engine component retains a tag that identifies the component, allowing an airline to track the component as it moves from aircraft to aircraft. As another example, when an assembly line is retrofit with a new press, technical information regarding the operation of the press can be stored directly on the press itself (e.g., in a tag). Thus, when a new computer numeric control ("CNC") component is provided to the press, technical information regarding the interface between the CNC and the press can be retrieved from the tag on the press.

The tagging of complex articles can be implemented over a wide range of scales. For example, an aircraft can be tagged, an aircraft engine on the aircraft can be tagged, and a turbine of the aircraft engine can be tagged. The type of computer-readable information stored on each component can be adjusted to the nature or operating environment of the component. For example: the aircraft can be tagged with a unique identifier; the aircraft engine can be tagged with a unique identifier, a log of flight time of the engine, and maintenance records of the engine; and the turbine can be tagged with a unique identifier and the results of previous non-destructive evaluations of the integrity of the turbine.

Hierarchical and other relationships can be defined between or among tracked components and can be used for tracking relationships between components. For example, an aircraft can be tagged with a tag that identifies one or more individual engines mounted to the aircraft during a certain period of time.

Data for the tags can be received from sensors that sense a trait of the article. Data can also be input from specialized devices designed to write to the component. For example: a tag on an aircraft can receive a time and data stamp from a writing device upon arrival at an airport; a tag on an aircraft engine can receive the flight hours of the engine from a sensor that senses the operation of the engine; and a tag on the turbine can receive input from a specialized non-destructive evaluation unit after testing. Tags can also receive information from other data sources, such as, e.g., systems that provide circumstantial information like weather, traffic conditions, transportation schedules, and so on.

The system can be integrated with existing software and hardware systems using open interfaces. With such interfaces, the system is compatible with existing systems without the need for plug-ins or upgrades into the existing systems. For example, the system can provide open interfaces to integrate virtually every kind of tag, tag reader, scanner, sensor, and application. The system can be implemented to include applications that can generically read data from, and write data to, article tags. The system can include generic tracking of real-time telemetry. The system can integrate existing geographical information systems ("GIS") and data.

The system can be integrated with existing software and hardware systems using closed interfaces. With such interfaces, the system is compatible only with systems that are licensed to use the closed interfaces. Such a restriction can prevent data from being accessed and changed by those not licensed to do so.

The system facilitates the scheduling and performance of maintenance of mobile articles such as airplanes, ships, and trains. For example, the system helps an operator determine which maintenance can be completed when an airplane makes a temporary stop over. Furthermore, the system does not need a central system to so facilitates maintenance because all the necessary data in stored on the tags. A military vessel, such as a nuclear submarine, operating at a remote locale thus need not communicate with a base to retrieve maintenance information and, advantageously, is able to maintain radio silence.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figures 1, 2:
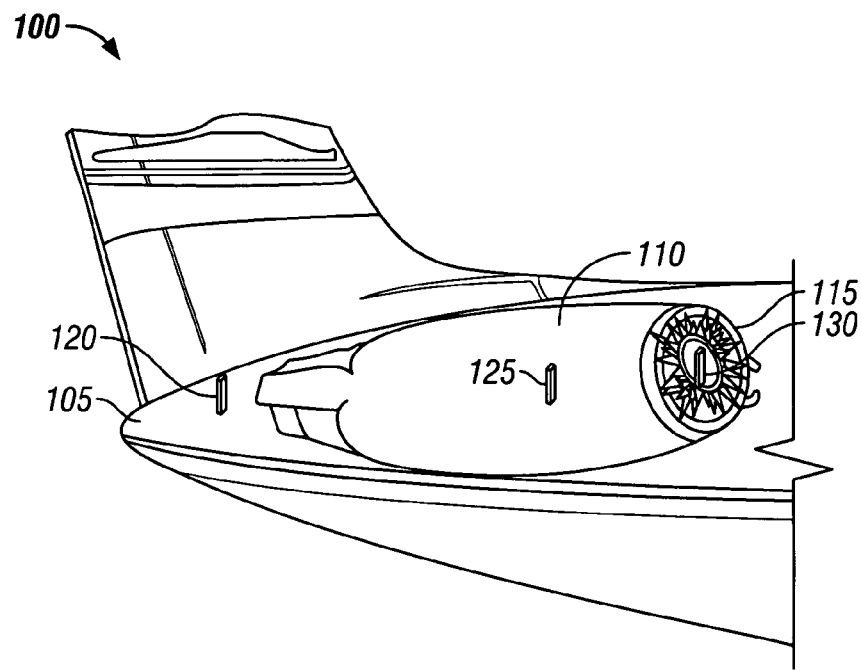
FIG. 1 shows an example of a complex article that is tagged.
FIG. 2 shows an example of a unique identification code.

FIG. 1 shows an example of a complex article, namely the tail of an aircraft 100, that is tagged. Aircraft 100 includes a body frame 105 that supports an engine 110. Engine 110 is a component of aircraft 100 and includes a compressor 115. Compressor 115 is a component of both engine 110 and aircraft 100. Body frame 105, engine 110, and compressor 115 are all tagged with electronically-accessible tags 120, 125, 130.

Tags 120, 125, 130 are electronically-accessible in that they store data in a machine-readable format. For example, tags 120, 125, 130 can store a computer-readable globally unique identifier ("GUI"). One such globally unique identifier is the Electronic Product Code ("ePC") of the MIT (Massachusetts Institute of Technology) AutoID Center. FIG. 2 illustrates the format of the ePC. Optionally, tags 120, 125, 130 can also include a processor to process data. For example, tags 120, 125, 130 can be smart cards or other devices that include a processor for processing information.

An interrogator (not shown) is a device for reading data from tags 120, 125, 130. The interrogator may also write to tags 120, 125, 130. Tags 120, 125, 130 can be, e.g., active and passive RFID tags, integrated circuit ("IC") microprocessor cards and memory cards, optical memory cards, barcodes, molecular tags, smart cards, or other computer-readable storage devices that include information relating to the identification of body frame 105, engine 110, and compressor 115, respectively. The interrogator can be any device capable of reading from tags 120, 125, 130 such as, e.g., an optical scanner, a transceiver, a molecular reader, a card reader, a card-accepting device, or other device for reading data that can be interfaced with a computer.

Additionally, tags 120, 125, 130 can include a user-interface device. The user-interface device can be part of the tag or be a separate device that is coupled to the tag. Such a user-interface device can include, e.g., an input device for sending information to the tags 120, 125, 130 and a display for displaying data read from tags 120, 125, 130. An operator can use a user-interface device to read data from tags 120, 125, 130 without relaying the read data to remote locations, or without writing additional information to tags 120, 125, 130.

Figure 3:
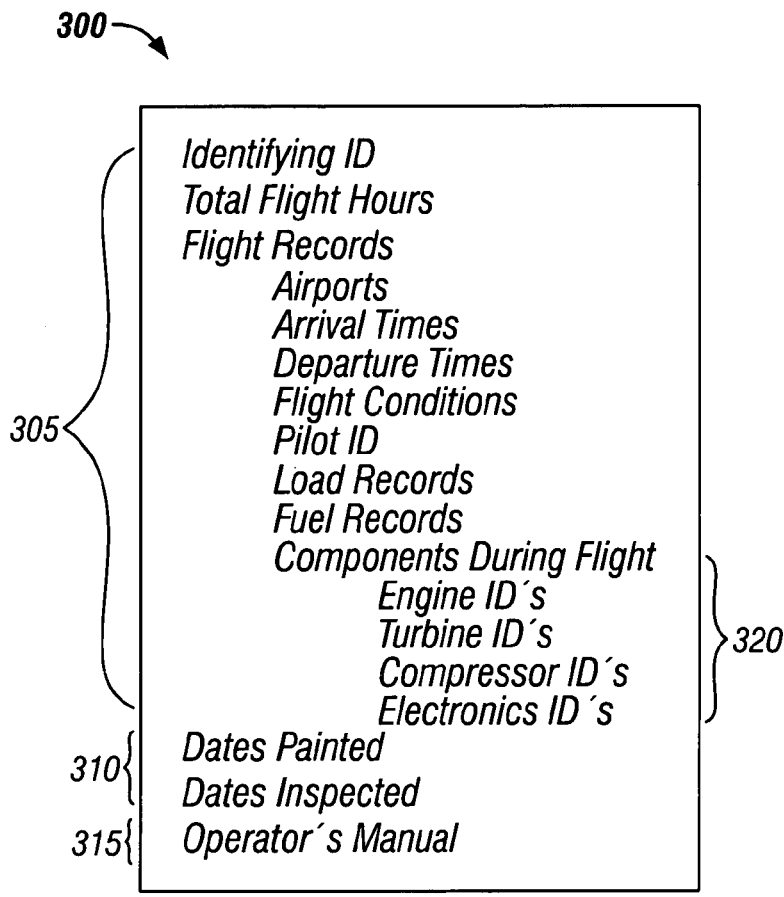
FIGS. 3, 4, and 5 show examples of maintenance information that can be stored on a tag.
Figure 5:
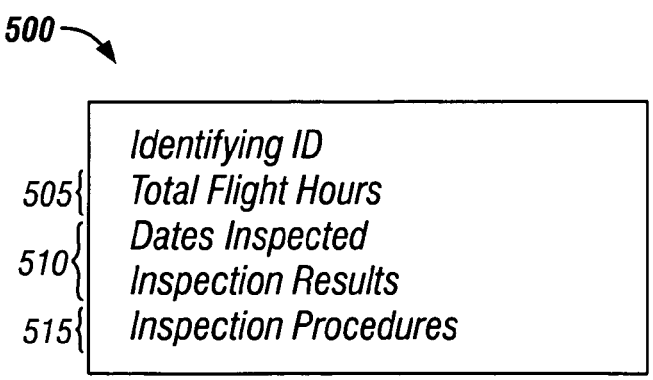
Figure 4:
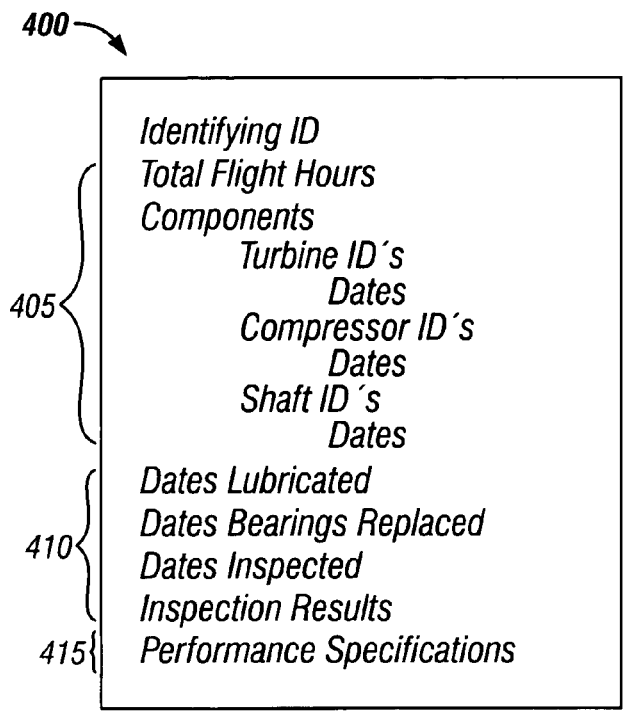

Tags 120, 125, 130 can also store information related to the operation, maintenance, repair, replacement, and technical characteristics of the respective components to which they are attached (i.e., body frame 105, engine 110, and compressor 115). As shown in FIGS. 3, 4, and 5, information 300, 400, 500 can include operating environment information associated with the body frame 105, engine 110, and compressor 115. In particular, information 300 includes examples of operation records 305, maintenance records 310, and technical characteristics 315 relating to aircraft 100 that can be stored in tag 120 mounted to body frame 105. Information 300 also include information 320 that identifies relationships between aircraft 100, engine 110, and compressor 115. For example, information 320 can identify the hierarchical relationship between aircraft 100 and components engine 110 and compressor 115 at different times.

Likewise, information 400 includes examples of operation records 405, maintenance records 410, and technical characteristics 415 relating to engine 110 that can be stored in tag 125 mounted to engine 110, and information 500 includes examples of operation records 505, maintenance records 510, and technical characteristics 515 relating to compressor 115 that can be stored in tag 130 mounted to compressor 115.

Information included in the technical characteristics 515, for example, can be: information describing procedures and technical specifications for performing preventive and corrective maintenance, the prerequisites to performing the maintenance (for example, safety requirements including safety tagging and electrical isolation, radiological controls requirements, and cleanliness requirements), and miscellaneous information describing the maintenance (such as the tools and equipment needed to do the maintenance, qualification of the operator or mechanic who is going to do the maintenance, and the time needed to perform the maintenance). Alternatively, the described information can be stored elsewhere, such as within information 300, 400, 500.

Figure 6:
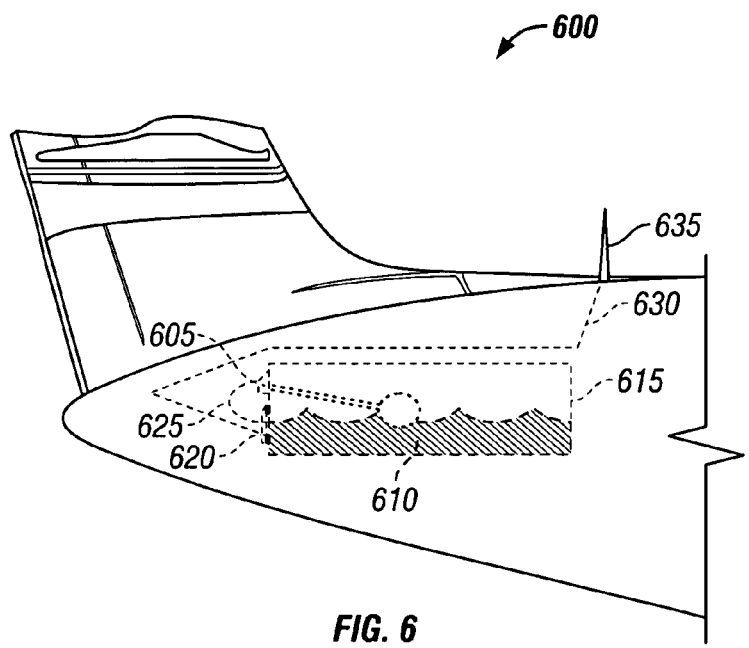
FIG. 6 shows another example of a complex article that is tagged.

A tag can also receive information from a sensor that senses a trait of the article or a component of the article. As shown in FIG. 6, an aircraft 600 includes a fuel level sensor 605 that measures the amount of fuel 610 in a fuel tank 615. Fuel tank 615 is a component of aircraft 600 and is tagged with a tag 620 that receives information about the amount of fuel 610 from fuel level sensor 605 over a communication line 625. Data from fuel level sensor 605 can be stored in raw form on tag 620, or a processor can process the data from fuel level sensor 605 to determine, e.g., the fuel consumed during a particular trip. For example, either tag 620 or sensor 605 can include such a processor. The processed results can be stored on tag 620.

In order to identify when a trip has been completed or to receive other information related to the operation, maintenance, repair, replacement, and technical characteristics of aircraft 600, tag 620 can also receive information from sources other than fuel level sensor 605. For example, tag 620 can receive information over a communication line 630 from an antenna 635 mounted to aircraft 600. Antenna 635 can wirelessly receive, e.g., information about the current location of plane 600 and local weather conditions.

Figure 7:
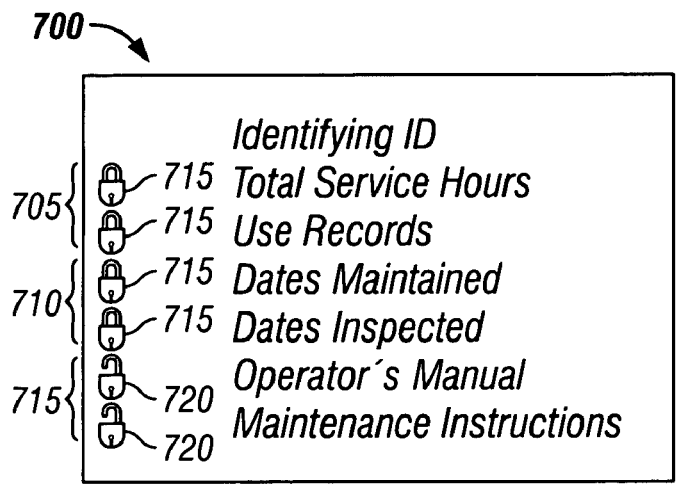
FIG. 7 shows another example of maintenance information that can be stored on a tag.

Information can be stored on the tags such as tags 120, 125, 130, 610 in open formats, closed formats, or a combination of both. FIG. 7 illustrates information 700 that is potentially stored on a tag, and characteristics of the format in which portions of information 700 are stored. In particular, information 700 includes operation records 705, maintenance records 710, and technical characteristics 715 that relate to a tagged article or a tagged component of an article. Operation records 705 and maintenance records 710 are stored in closed formats, as indicated by locked icons 715. Technical characteristics 715 are stored in open formats, as indicated by unlocked icons 720. Example open standards include the rich text format ("RTF"), the extensible markup language ("XML") over the hypertext transfer protocol ("HTTP"), the portable document format ("PDF") standard, the American Standard Code for Information Interchange ("ASCII"), and post-script files. Examples of closed standards include proprietary formats.

A tag can be mechanically coupled to a component by a variety of ways. For example, the tag can be coupled by using fasteners, adhesives, welding, or any combination thereof. Devices such as the described user-interface device and the sensor can be similarly coupled to the component or the tag.

Figure 8:
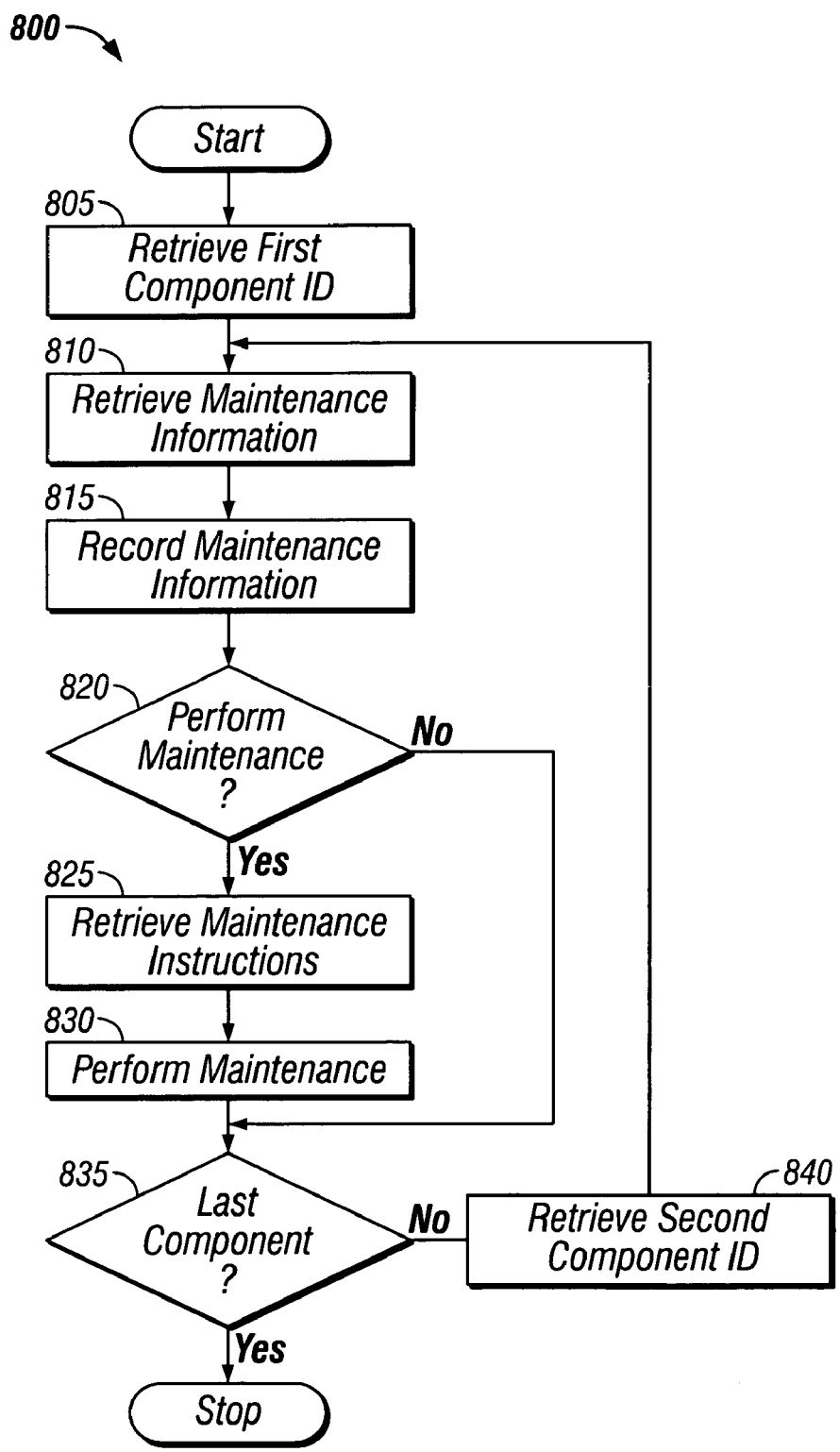
FIG. 8 shows a method for maintaining a complex article.

FIG. 8 shows an example of a method 800 for tracking, operating, and maintaining a complex article using one or more electronically-accessible tags coupled to one or more components of the complex article. An interrogator performing method 800 first retrieves a GUI or other identifier that identifies a first component of the complex article (step 805). The identifier is retrieved from an electronically-accessible tag that is coupled to the component. The interrogator can retrieve the ID, e.g., by optically or electronically scanning the tag.

The interrogator also retrieves maintenance information from the tag (step 810). The maintenance information can include, e.g., a historical record of maintenance that has been performed on the component, a historical record of the past operation of the component, or information related to procedures for maintaining the component. The information can be stored in an open standard or in a closed standard.

If necessary, the retrieved maintenance information can be recorded so that the information is made available separately from the tag (step 815). For example, the retrieved maintenance information can be relayed to a central database system for storage or analysis. Recording the retrieved information separately from the tag creates a back-up copy of the maintenance information, and allows analyses that require increased amounts of processing power or information from disparate information sources to be performed. Examples of disparate information sources include multiple electronically-accessible tags coupled to the components of a complex article, as well as multiple electronically-accessible tags distributed throughout a fleet of complex articles.

The interrogator, or a human user operating the interrogator, makes a decision as to whether or not a maintenance operation is to be performed (decision 820). The maintenance operation can be performed on the tagged component, or on another component of the article. The decision can be based on the time since the last maintenance operation was performed, the operational history of the component, or combinations of these and other factors. The decision can be based on the service hours of a component. The decision can also be based on information from disparate, multiple, electronically-accessible tags.

If it is decided to perform the maintenance operation, then instructions for performing the maintenance operation can be retrieved from the electronically-accessible tag, if needed (step 825). For example, the volume of oil that lubricates an engine can be retrieved from a tag mounted to the engine. This capability minimizes the chance that maintenance is delayed while maintenance instructions are located, or that incorrect maintenance instructions are inadvertently used. The maintenance operation can then be performed (step 830). The performance can be based on the retrieved instructions, as appropriate.

A second decision is made as to whether the last component of the article has been interrogated, or if the interrogation is to end (decision 835). This decision can be made by a user, or it can be made by the interrogator or other processing system based on information that identifies a relationship between one or more components of an article and the article itself, and/or one or more components of a component and the component itself. If it is decided that the last component has been interrogated, then method 800 ends.

Alternatively, if it is decided that additional components are to be interrogated, then the interrogator retrieves a GUI or other identifier that identifies another component of the complex article (step 840) and again retrieves maintenance information regarding the next component and decides whether maintenance is necessary.

Maintenance information need not be retrieved from the same component upon which a maintenance operation is performed, or from which maintenance instructions are retrieved. For example, information relating to the fuel usage of an engine in a single engine motor vehicle can be retrieved from an electronically-accessible tag on a fuel tank, while instructions for adjusting the operation of an engine can be retrieved from an electronically-accessible tag on the body frame.

The following describes an example implementation of method 800. Aircraft 100 described above is flying from Frankfurt to San Francisco with a two-hour stop over in Washington D.C. As the aircraft 100 lands in Washington D.C., an operator, such as an engine mechanic, who is responsible for maintenance of the aircraft can interrogate tag 125 to determine which, if any, preventive maintenance can be performed on engine 110 during the two-hour stop over. The operator can use an interrogator such as the one described above or, alternatively, can interface with tag 125 through a user-interface device that is coupled to or included with tag 125. Tag 125 includes information that specify all preventive maintenance for engine 110. The information can, for example, specify the preventive maintenances that have not been performed for the current maintenance cycle and are due. The operator provides information that specify resources available to perform the maintenance. Such information can include the qualification of the mechanic, the maintenance equipment locally available to perform the maintenance, as well as any time constraints such as the two-hour limit. Such information can be stored in the interrogator. Using information stored on tag 125 and information provided by the operator, tag 125 determines which preventive maintenance, if any, can be performed during the stop over and presents these maintenance options to the operator. Alternatively, the interrogator can retrieve maintenance information from tag 125, make the determination, and present the options to the operator. In response to a selection from the operator, the tag provides the appropriate procedures and technical specifications for performing the selected maintenance. When the operator completes the maintenance, the operator stores a record of the maintenance completion in tag 125.

Figure 9:
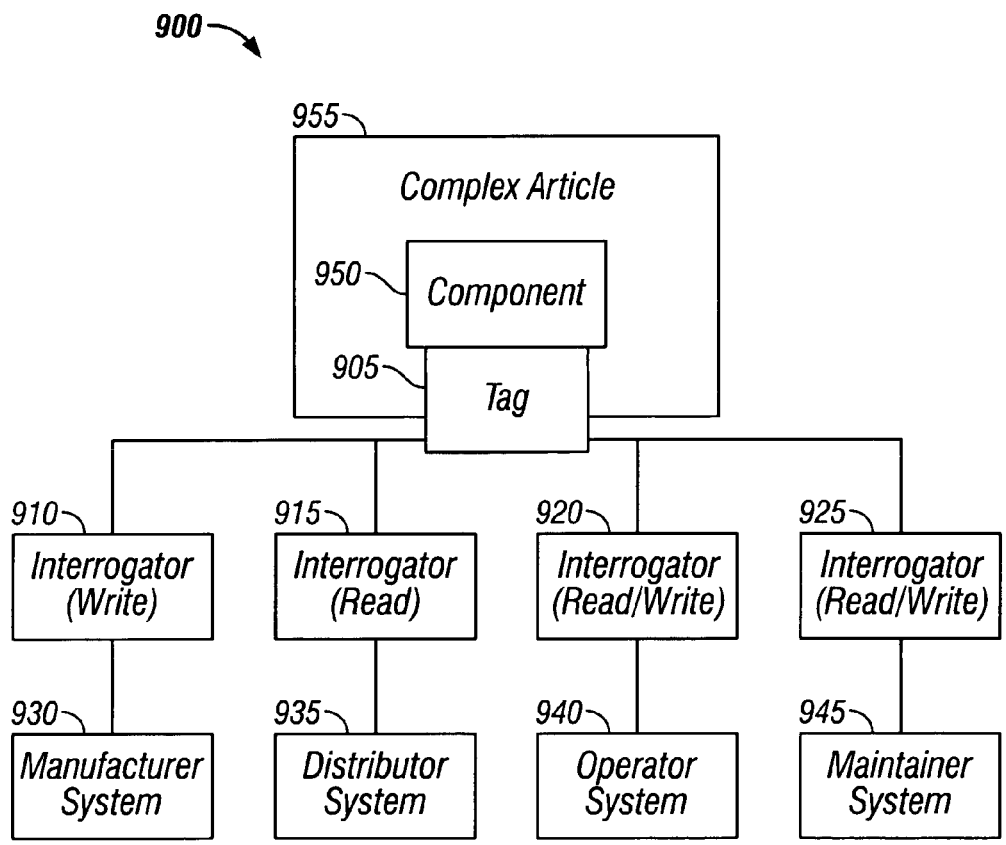
FIG. 9 shows a system landscape for maintaining a complex article.

As shown in FIG. 9, a system landscape 900 can include multiple, independent systems using methods and apparatus, including computer program products, for maintaining a complex article in accordance with the invention. In particular, system landscape 900 includes a tag 905, a collection of interrogators 910, 915, 920, 925, and a collection of systems 930, 935, 940, 945. Tag 905 is coupled to a component 950 of a complex article 955 and can store information that identifies tag 905, as well as maintenance records, operational records, and technical characteristics of component 950 and/or complex article 955.

Interrogator 910 and system 930 are operated by a manufacturer of complex article 955 or a manufacturer of component 950. Interrogator 910 can write to tag 905. System 930 contains information and instructions relating to the maintenance of component 950 and/or complex article 955, and for providing component 950 with an identifier. For example, system 930 can include a database that stores technical information about the operation and maintenance of component 950 and instructions for performing maintenance operations on component 950.

Interrogator 915 and system 935 are operated by a distributor of complex article 955 or component 950. Interrogator 915 can read from tag 905. System 935 contains information relating to the distribution of component 950 and/or complex article 955. For example, system 950 can include a database that includes information relating to the location of component 950 as it moves through a distribution system.

Interrogator 920 and system 940 are operated by an operator of complex article 955 that includes component 950. Interrogator 920 can write to and read from tag 905. System 940 contains information and instructions relating to the maintenance of component 950 and/or complex article 955, and for tracking component 950 as it changes locations during operation. For example, system 940 can include a database that stores information about the performance of maintenance operations upon component 950, the operational records of component 950, as well as operational records, maintenance records, and location records of other components.

Interrogator 925 and system 945 are operated by a maintainer of tagged component 950 and/or complex article 955. Interrogator 925 can write to and read from tag 905. System 945 contains information and instructions relating to the maintenance of component 950 and/or complex article 955, and for tracking component 950 as it changes locations during operation. For example, system 945 can include a database that stores information about the performance of maintenance operations upon component 950, the operational records of component 950, as well as operational records, maintenance records, and location records of other components.

Any of the roles described above need not be present in a system landscape in accordance with the invention. For example, a manufacturer can also distribute tagged component 950, or an operator can also maintain tagged component 950 or complex article 955. Furthermore, additional roles not described above can be included in the system landscape. For example, a retailer can transfer the complex article from the distributor to the operator, more than one operator can operate a single tagged component 950 or complex article 955, or more than one maintainer can maintain a single tagged component 950 or complex article 955.

Complex article 955 can include more than one component and more than one component tag. In this case, complex article 955 can include a general tag. The general tag includes information that describe the complex article as a whole. Such information can include a hierarchy of the components of complex article 955. For example, the information can specify that one component is part of another component. Such information can also include maintenance information for the complex article as a whole. For example, the general tag can include a log of component replacement and, furthermore, can identify a particular component even when the particular component and its tag has been removed from complex article 955. The general tag can also include logic and data for and managing and prioritizing the maintenance of all components of complex article 955. For example, the logic and data can specify that maintenance on a vital component is more important to perform than maintenance on a non-vital component. Alternatively, all information included in the general tag can be stored on component tags. A component tag can include information that describes all or part of the component hierarchy.

Figure 10:
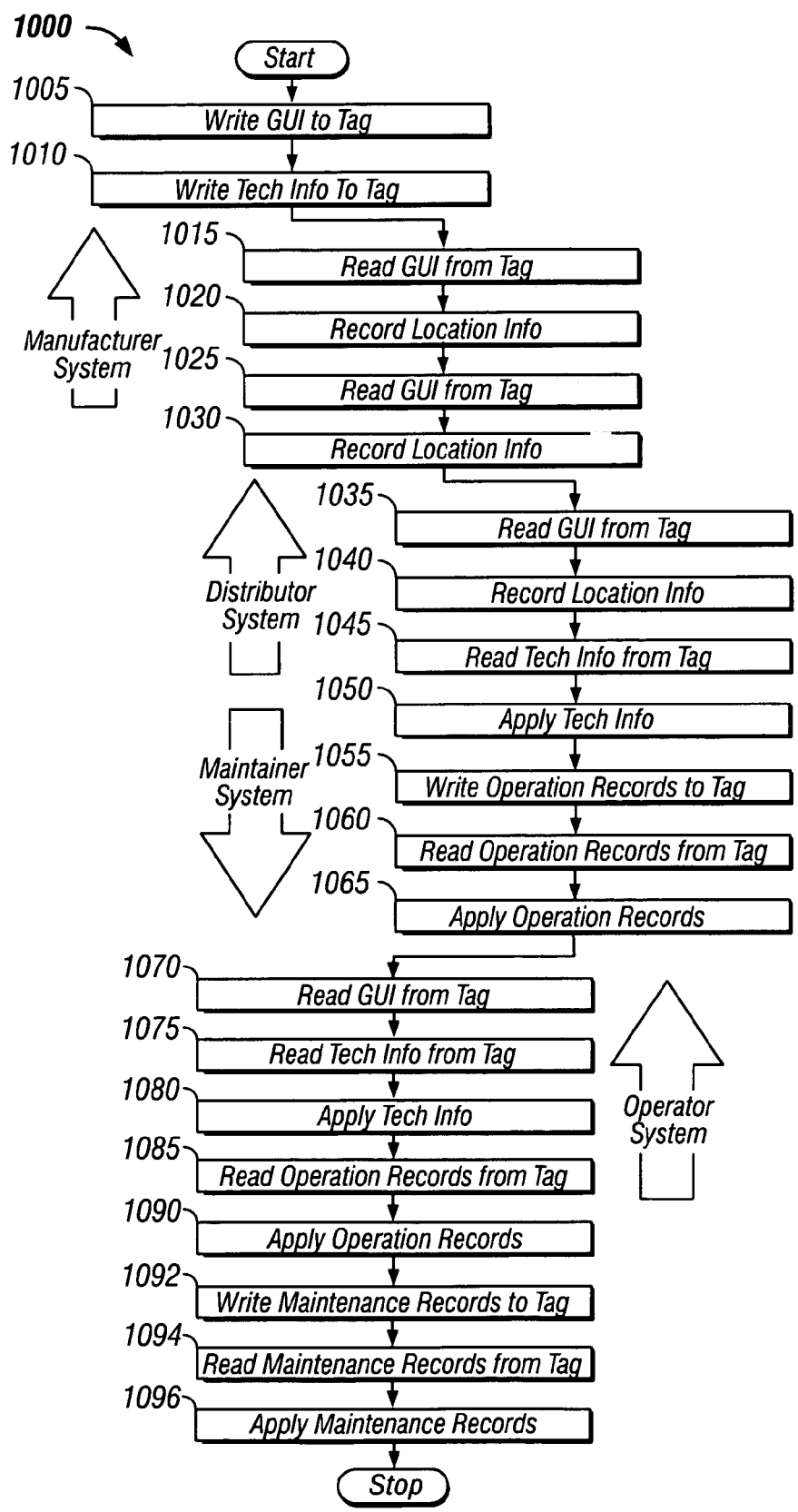

FIG. 10 shows an example method 1000 by which systems 930, 935, 940, 945 interact with a tag such as tag 905. During the performance of method 1000, manufacturer system 930 writes a globally unique identifier to tag 905 (step 1005) and technical information about the component to tag 905 (step 1010). The GUI and technical information can be written after or before tag 905 is mounted to the component. For example, the GUI and technical information can be written to tag 905g in a read-only format during manufacture of tag 905. The GUI and technical information can be written, e.g., in an open standard.

At some point the manufacturer transfers the tagged component to a distributor. The tagged component can be provided as a stand alone element, or as a component of an assemblage of components such as a complex article. Distributor system 935 reads tag 905 and identifies the component from the GUI (step 1015). Distributor system 935 records location information that identifies the location of tag 905, and hence the location of the tagged component (step 1020).

The distributor can now move and track the tagged component through a distribution system. For example, the distributor can move the tagged component from a central warehouse to a regional distribution center. To track tag 905, distributor system 935 again reads the GUI from tag 905 (step 1025) and records location information that identifies the location of tag 905 and the tagged component (step 1030). If the GUI is in an open standard, then the distributor need not require specialized equipment or licenses to track the component in the distribution system.

At some point the distributor transfers the tagged component to an operator. The tagged component can be provided as a stand alone element, or as a component of an assemblage of components such as a complex article. Operator system 940 reads tag 905 and identifies the component from the GUI (step 1035). Operator system 940 records location information that identifies the location of tag 905, and hence the location of the tagged component (step 1040). Operator system 940 can repeatedly read the GUI from tag 905 and record location information to track the tagged component as it moves through an operation system. For example, operator system 940 can track the location of a tagged aircraft engine as it moves from plane to plane, and from airport to airport.

Operator system 940 can also read technical information about the component from tag 905 (step 1045) and apply the read technical info as appropriate (step 1050). For example, operator system 940 can read the technical characteristics of the component from the tag to determine if the component is compatible with other components in a complex article.

At some point, the operator of the tagged component will place the tagged component in service. Operation records describing the nature of the service can be written to tag 905. For example, as discussed above, a sensor that is mounted to the component, or another component of a complex article, can write records to tag 905. Alternatively, operator system 940 can write operation records to tag 905 (step 1055). For example, operator system 940 can write the identities or characteristics of other components in a complex article to tag 905. Operator system 940 can write also write other operation records, such as, e.g., location information or performance information, to tag 905.

The operation records can be written by operator system 940 using a closed standard. This can prevent others from accessing or changing the operational records of the tagged component without the authorization of the operator.

Operator system 940 can also read operation records about the operation of the tagged component from tag 905 (step 1060) and apply the read operation records as appropriate (step 1065). For example, operator system 940 can apply the read operation records to retrieve sensor measurements to determine the operational behavior of the tagged component or to compare the operational behavior of the tagged components to the expected operational behavior. Operator system 940 can also apply the read operation records to determine when maintenance of the tagged component is needed.

At some point, the operator will transfer the tagged component to a maintainer. For example, an airline that operates an aircraft with a tagged engine can allow a maintenance organization to inspect and maintain the aircraft. Maintainer system 945 reads tag 905 and identifies the component from the GUI (step 1070). Maintainer system 945 can also read technical information about the component from tag 905 (step 1075) and apply the read technical info as appropriate (step 1080). For example, maintainer system 945 can read instructions for maintaining the tagged component from tag 905, and display the instruction for use in performing a maintenance operation.

Maintainer system 945 can also read operation records about the operation of the tagged component from tag 905 (step 1085) and apply the read operation records as appropriate (step 1090). For example, maintainer system 945 can apply the read operation records to determine when maintenance of the tagged component is needed and the type of maintenance operation that is to be performed. Maintainer system 945 can apply the read operation records by, e.g., displaying the operation records to a user who makes a decision as to whether maintenance is necessary or by relaying the operation records to a processor that makes a maintenance decision based on predetermined rules.

Maintainer system 945 can also write maintenance records to tag 905 (step 1092). For example, maintainer system 945 can write the date that a certain maintenance operation has been performed, or the results of a maintenance or inspection operation. The maintenance records can be written by maintainer system 945 using a closed standard. The closed standard can be shared with others as desired. For example, an operator and one or more maintainers can use a common closed format for operation and maintenance records. This can prevent others from accessing and changing the maintenance records of the tagged component without the authorization of the operator and/or the maintainer.

Maintainer system 945 can also read maintenance records about the maintenance of the tagged component from tag 905 (step 1094) and apply the read maintenance records as appropriate (step 1096). For example, operator system 940 can apply the read maintenance records to determine when maintenance or inspection of the tagged component is needed and the type of maintenance or inspection operation that is to be performed. Maintainer system 945 can apply the read maintenance records by, e.g., displaying the maintenance records to a user who makes a decision as to whether maintenance is necessary or by relaying the maintenance records to a processor that makes a maintenance decision based on predetermined rules or artificial intelligence approaches.

As discussed above, when the complex article includes more than one component and more than one component tag, either the component tags or a general tag can include information that describes the complex article as a whole. An interrogator can thus retrieve such information from either a general tag or a component tag.

Figure 11:
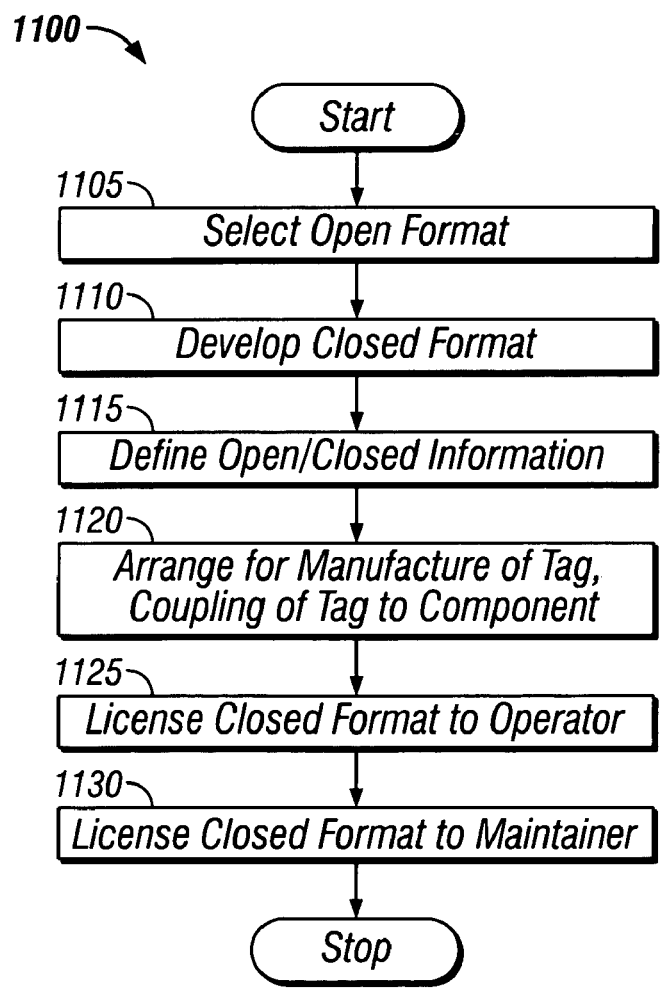
FIGS. 10 and 11 show methods for maintaining a complex article.

FIG. 11 shows an example method 1100 by which a company or other entity can profit from the maintenance of a complex article that includes a tagged component. In particular, an entity can select an open, public format for the storage of information upon a tag (step 1105). The entity can also develop a closed standard for the storage of information upon the tag (step 1110). The entity can also define which information is to be stored in the selected open format upon the tag, and which information is to be stored in the closed standard upon the tag (step 1115). The definition can be performed by the entity itself, or in conjunction with a manufacturer of the component that is to be tagged. The results of the definition can reflect a need for securing certain information. For example, the definition can define that identifying information is to be stored in an open format, while maintenance records are to be stored in a closed format to prevent unauthorized users from reading and writing maintenance records.

The entity can also arrange for the manufacture of a tag with the defined open and closed formats and information, as well as the coupling of the tag to a component of a complex article (step 1120). The entity can arrange for the manufacture by, e.g., manufacturing the tag itself or by licensing a design to a tag manufacturer. Similarly, the tag can be coupled to the component by the entity, a tag manufacturer, or a component manufacturer.

The entity can also license the closed standard for data to an operator of the complex article (step 1125). The license, for example, can allow all maintenance employees of the operator to use the standard.

The entity can also license the closed standard for data to one or more maintainers of the complex article (step 1130). In this case, the license can be sold to the businesses that the operator of the complex articles has employed to perform the maintenance.

By licensing the closed standard to operators and/or maintainers, the entity can receive an income stream even when no new tag purchases are made. Moreover, since tags can be designed to be robust and survive for many years, the income stream can be used to offset the cost of the capital investment in the tags.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

A number of embodiments of the invention have been described. Nevertheless, it will be understood that various modifications may be made without departing from the spirit and scope of the invention. For example, the steps of the invention can be performed in a different order and still achieve desirable results. Accordingly, other embodiments are within the scope of the following claims.

What is claimed is:

1. A method for storing maintenance information on an electronically-accessible tag that is coupled to an article, the method comprising:
    storing first maintenance information in a first format and second maintenance information in a second format in the electronically-accessible tag, the first format being open to general access and the second format being closed to general access.

2. The method of claim 1, wherein the first format is device independent.

3. The method of claim 1, wherein the first format is in accordance with one of RTF, ASCII, and PDF.

4. The method of claim 1, wherein the second format is proprietary and can only be accessed by proprietary devices.

5. The method of claim 1, further comprising:
    retrieving at least one of the first maintenance information and the second maintenance information;
    updating a format of the retrieved maintenance information; and
    storing the retrieved maintenance information with an updated format in the electronically-accessible tag.

6. The method of claim 1, wherein at least one of the first maintenance information and the second maintenance information comprises maintenance procedures and technical specifications related to the article.

7. The method of claim 1, wherein storing the first maintenance information and the second maintenance information includes:
    storing a first type of maintenance information in the first format; and
    storing a second type of maintenance information in the second format.

8. The method of claim 7, wherein
    the first type of maintenance information comprises maintenance logs; and the second type of maintenance information comprises maintenance procedures and technical specifications.

9. The method of claim 1, wherein at least one of the first maintenance information and the second maintenance information comprises maintenance information regarding a component of one of an aircraft, a sea going vessel, and a vessel that travels on land.

10. The method of claim 1, wherein the first maintenance information comprises a maintenance instruction.

11. The method of claim 1, wherein the second information comprises an inspection record.

12. The method of claim 1, wherein the second maintenance information comprises a date when maintenance was performed.

13. The method of claim 1, wherein storing first maintenance information and second maintenance information comprises:
    storing first maintenance information and second maintenance information about components of a complex article in a plurality of electronically-accessible tags that are coupled to the components.

14. An electronically-accessible tag, comprising:
    memory that comprises first maintenance data of a first format and second maintenance data of a second format, the first format being open to general access and the second format being closed to general access, the electronically-accessible tag being coupled to an article.

15. The electronically-accessible tag of claim 14, wherein the first format is device independent.

16. The electronically-accessible tag of claim 14, wherein the first format is in accordance with one of RTF, ASCII, and PDF.

17. The electronically-accessible tag of claim 14, wherein the second format is a proprietary format.

18. The electronically-accessible tag of claim 14, wherein at least one of the first maintenance data and the second maintenance data comprises maintenance procedures and technical specifications of the article.

19. The electronically-accessible tag of claim 14, further comprising:
    an input and output device for sending first maintenance data and second maintenance data and for receiving updated maintenance data.

20. The electronically-accessible tag of claim 14, further comprising:
    a processor and logic for updating the first format and the second format.

21. The electronically-accessible tag of claim 14, wherein:
    first maintenance data of the first format comprises maintenance logs; and
    second maintenance data of the second format comprises maintenance procedures and technical specifications.

22. The electronically-accessible tag of claim 14, wherein:
    the article comprises one of an aircraft, a sea going vessel, and a vessel that travels by land; and
    the first maintenance data and the second maintenance data comprises maintenance data of one or more components of the aircraft, sea going vessel, or vessel that travels by land.

23. The electronically-accessible tag of claim 14, wherein the first maintenance data comprises a maintenance instruction.

24. The electronically-accessible tag of claim 14, wherein the second maintenance data comprises an inspection record.

25. The electronically-accessible tag of claim 14, wherein the second maintenance data comprises a date when maintenance was performed.

* * * * *